United States Patent [19]

Stursberg

[11] Patent Number: 5,156,077
[45] Date of Patent: Oct. 20, 1992

[54] SAW FOR HEAVY STEEL WORKPIECES

[75] Inventor: Bernd Stursberg, Ennepetal, Fed. Rep. of Germany

[73] Assignee: Rolf Peddinghaus, Ennepetal, Fed. Rep. of Germany

[21] Appl. No.: 760,531

[22] Filed: Sep. 16, 1991

[30] Foreign Application Priority Data

Sep. 22, 1990 [DE] Fed. Rep. of Germany ....... 4030083

[51] Int. Cl.⁵ .............................................. B26D 5/42
[52] U.S. Cl. ...................................... 83/369; 83/210; 83/282; 83/452
[58] Field of Search ................. 83/369, 282, 452, 465, 83/375, DIG. 2, 364, 208, 210

[56] References Cited

U.S. PATENT DOCUMENTS

| | | | |
|---|---|---|---|
| 3,141,367 | 7/1964 | Keener et al. | 83/282 X |
| 3,415,149 | 12/1968 | Ziljberman et al. | 83/369 X |
| 3,707,103 | 12/1972 | Tishken | 83/282 X |
| 3,853,028 | 12/1974 | Jägers | 83/465 X |
| 3,871,258 | 3/1975 | Hurn | 83/282 X |
| 4,152,959 | 5/1979 | Elhaus | 83/369 X |
| 4,342,240 | 8/1982 | Gaiser et al. | 83/282 X |

*Primary Examiner*—Frank T. Yost
*Assistant Examiner*—Ken Peterson

*Attorney, Agent, or Firm*—Herbert Dubno; Andrew Wilford

[57] ABSTRACT

A sawing apparatus has a frame, a saw blade rotatable on the frame about a horizontal axis and displaceable transversely of the axis, and a conveyor for displacing an elongated workpiece longitudinally in a transport direction generally parallel to the saw-blade axis past the saw blade. The conveyor has upstream and downstream drive rollers flanking the blade mounted on the frame on one side of the workpiece and respective upstream and downstream holding rollers mounted on the frame transversely juxtaposed with the drive rollers and engaging the opposite longitudinal side of the workpiece. Upstream and downstream abutment blocks on the frame engageable with the one side of the workpiece immediately flank the blade and upstream and downstream pusher blocks on the frame engage the opposite longitudinal side of the workpiece transversely opposite the respective abutment blocks. Upstream and downstream measuring rollers on the frame transversely engage the workpiece immediately upstream and downstream from the blade and are associated with respective sensors that detect how much of the workpiece has passed the respective measuring rollers in contact therewith. Respective upstream and downstream biasing units on the frame urge the measuring rollers independently of each other transversely against the workpiece.

7 Claims, 3 Drawing Sheets

SAW FOR HEAVY STEEL WORKPIECES

FIELD OF THE INVENTION

The present invention relates to a saw. More particularly this invention concerns a saw used to longitudinally subdivide a heavy steel workpiece.

BACKGROUND OF THE INVENTION

A sawing apparatus for a massive steel casting or beam typically has a saw blade rotatable about a horizontal axis and displaceable transversely of the axis and a conveyor that displaces an elongated workpiece longitudinally in a transport direction generally parallel to the saw-blade axis past the saw blade. The conveyor has a drive roller and holder rollers grip the workpiece upstream of the blade and feed it controlledly to and past the blade and may have a second such pair of rollers downstream of the blade to pull off the piece cut from the workpiece. Similarly an abutment block and a pusher block can be brought longitudinally together upstream of the blade to grip the workpiece and hold it in place during cutting.

In order to determine how much is being cut off the workpiece, one or more measuring rollers engage the workpiece immediately adjacent the drive and holder rollers upstream of the saw blade. One of these measuring rollers is provided with a rotation sensor that generates an output corresponding to the length of the workpiece that has moved past in contact with the measuring roller. This allows the machine to operate fairly automatically to cut measured pieces off the workpiece.

The disadvantage of this system is that long pieces must be discarded which have lengths that at least correspond to the distance between the upstream drive roll and the saw blade. In addition the assembly comprising the drive roller and holder roller is normally attached upstream of the blade on the frame carrying the blade, so that it is quite some distance from this blade. This increases the amount of waste and also the overall bulkiness of the apparatus. The size of the apparatus is increased yet further when it is used for angled cuts, not simply right-angle ones.

OBJECTS OF THE INVENTION

It is therefore an object of the present invention to provide an improved saw apparatus.

Another object is the provision of such an improved saw apparatus which overcomes the above-given disadvantages, that is which is relatively compact, which cuts very accurately, and which wastes virtually nothing of the workpiece.

SUMMARY OF THE INVENTION

A sawing apparatus according to this invention has a frame, a saw blade rotatable on the frame about a horizontal axis and displaceable transversely of the axis, and a conveyor for displacing an elongated workpiece longitudinally in a transport direction generally parallel to the saw-blade axis past the saw blade. The conveyor has upstream and downstream drive rollers flanking the blade and mounted on the frame on one side of the workpiece and respective upstream and downstream holding rollers mounted on the frame transversely juxtaposed with the drive rollers and engaging the opposite longitudinal side of the workpiece. Upstream and downstream abutment blocks on the frame engageable with the one side of the workpiece immediately flank the blade and upstream and downstream pusher blocks on the frame engage the opposite longitudinal side of the workpiece transversely opposite the respective abutment blocks. Upstream and downstream measuring rollers on the frame transversely engage the workpiece immediately upstream and downstream from the blade and are associated with respective sensors that detect how much of the workpiece has passed the respective measuring rollers in contact therewith. Respective upstream and downstream biasing units on the frame urge the measuring rollers independently of each other transversely against the workpiece.

Thus the workpiece always stays in contact with at least one measuring roller, ensuring that no mismeasurements are possible. In addition the waste will be reduced because of the short spacing between the measuring rollers and the blade. In fact an end piece can be cut into slices.

According to features of this invention one of the holding rollers is provided with the respective sensor means and also acts as the respective measuring roller. In addition the frame includes a common slide on which are mounted the measuring rollers and the respective biasing unit and the frame is provided with means for urging the entire slide with the measuring rollers and their biasing unit transversely toward the workpiece. This slide can also carry the abutment and holding blocks and their independently operable actuators.

In accordance with this invention the saw-blade axis is substantially parallel to the transport direction so that the saw blade cuts through the workpiece at 90°. Furthermore the frame has a transverse dimension of 50 cm to 60 cm, the drive rollers have a diameter of 10 cm to 12.5 cm, and the holding rollers have diameters at most equal to the diameters of the respective drive rollers. The drive rollers longitudinally symmetrically flank the blade and are longitudinally spaced by a distance equal generally to their diameter. The blocks are steel plates that longitudinally equidistantly flank the blade and that lie in planes parallel to that of the blade.

BRIEF DESCRIPTION OF THE DRAWING

The above and other objects, features, and advantages will become more readily apparent from the following, reference being made to the accompanying drawing in which.

DESCRIPTION

Figure 1:
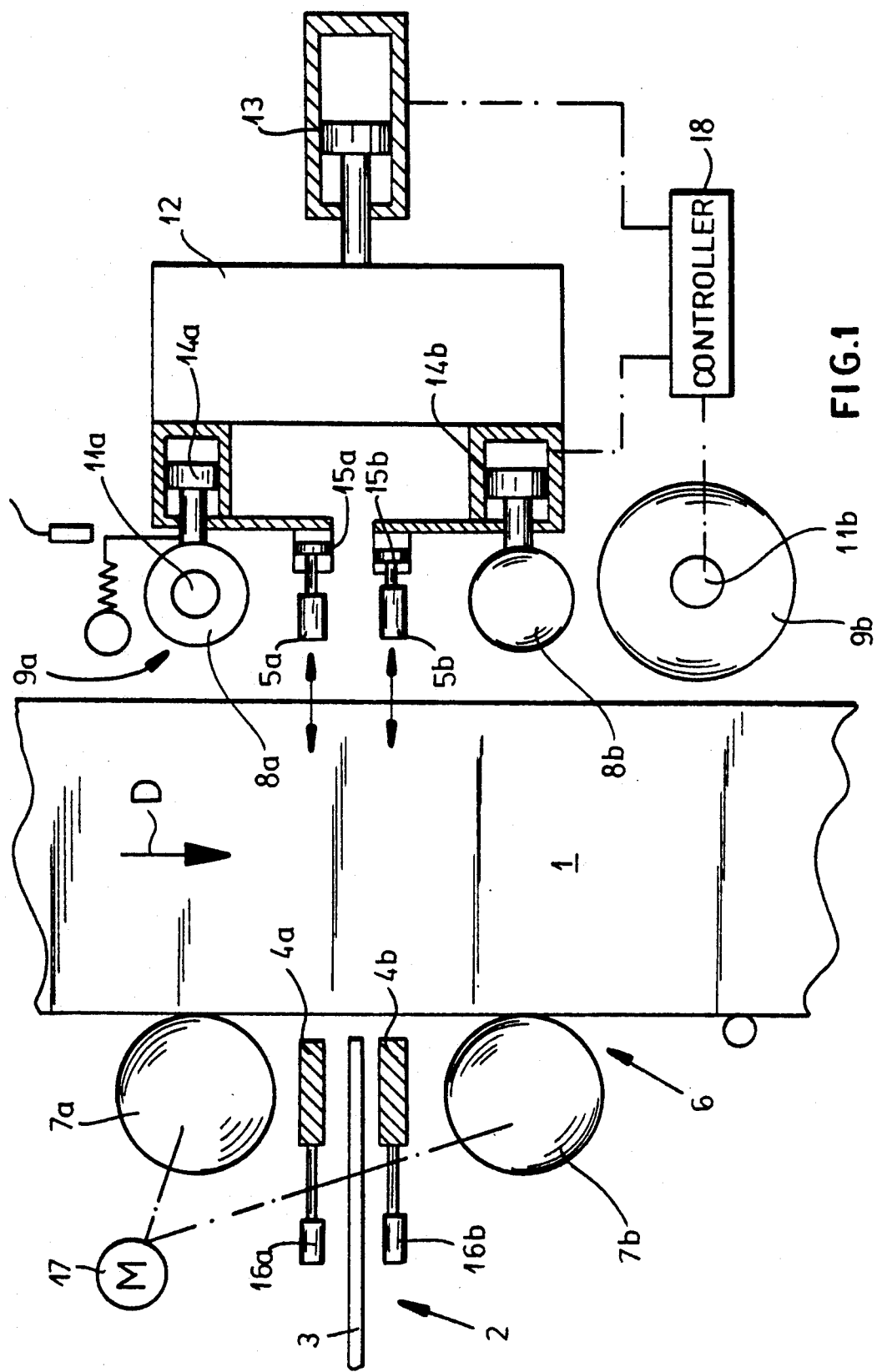
FIG. 1 is a mainly schematic top view of a sawing apparatus according to the invention.
Figure 2:
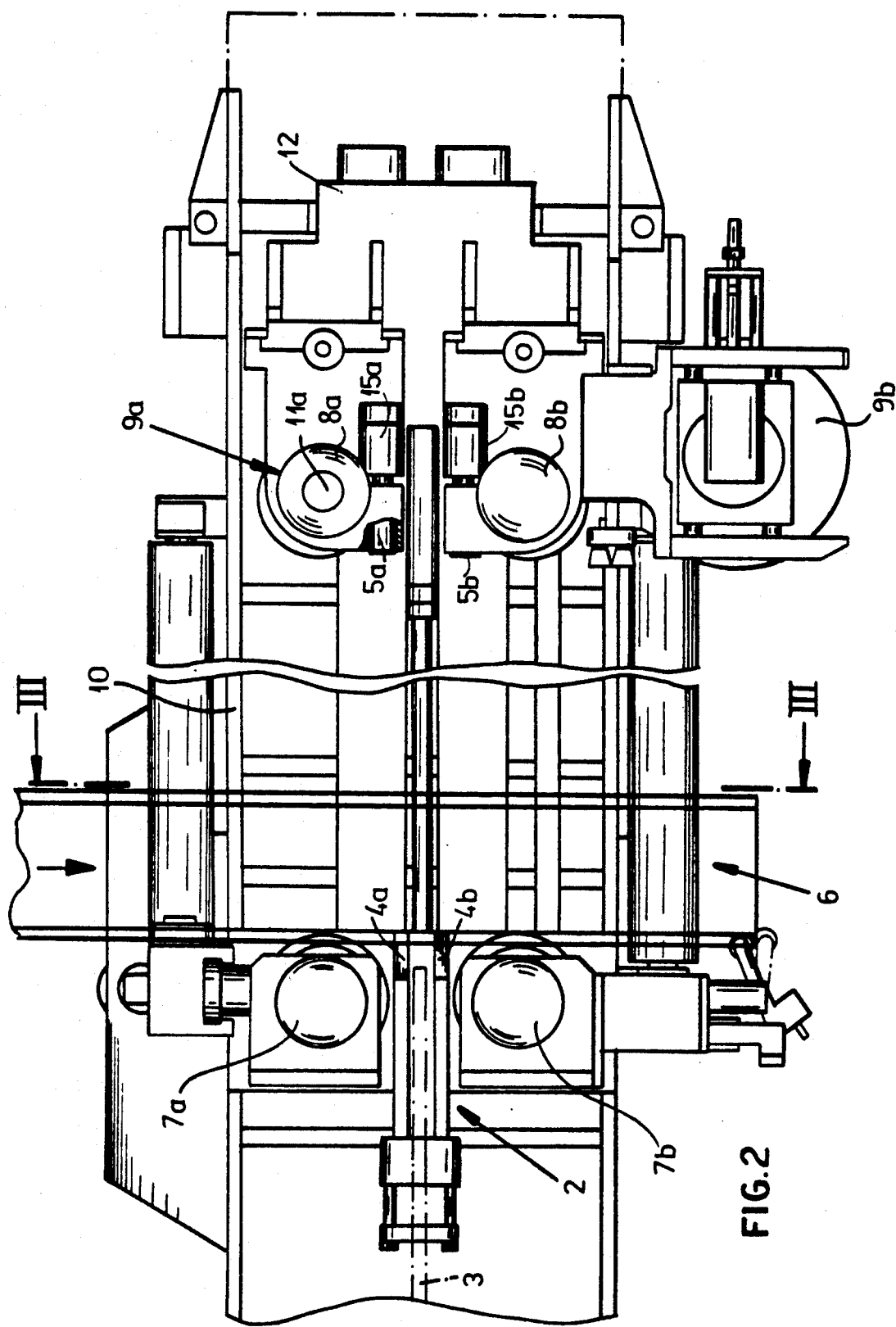
FIG. 2 is a view like FIG. 1 but in more structural detail.
Figure 3:
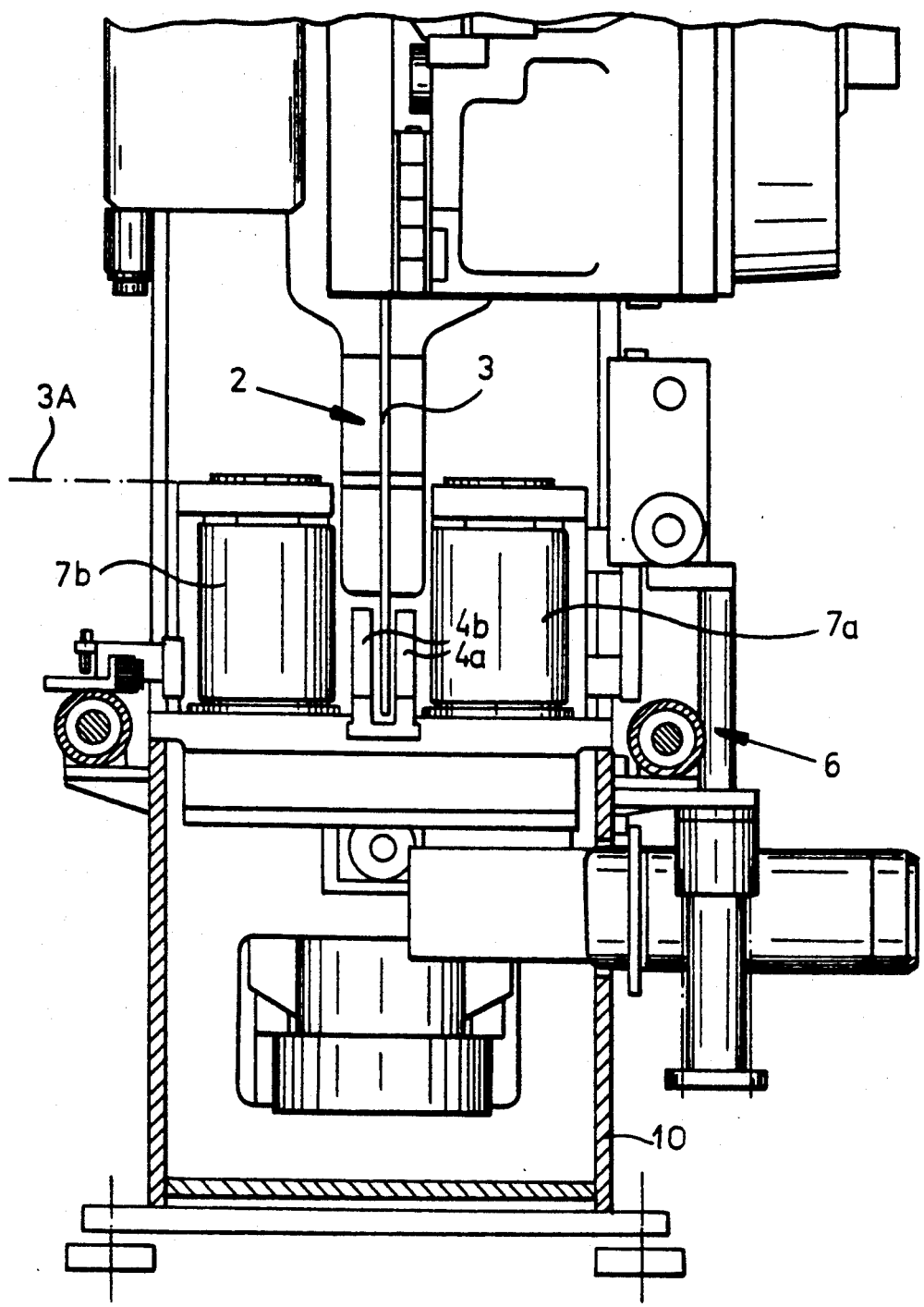
FIG. 3 is a section taken along line III—III of FIG. 2.

As seen in FIGS. 1 through 3 a workpiece 1, here a heavy steel beam, is longitudinally subdivided by a saw 2 having a circular blade 3 rotated about a horizontal axis parallel to the longitudinal direction of the workpiece 1. A conveyor 6 displaces the workpiece 1 longitudinally in a transport direction D and basically comprises upstream and downstream drive rollers 7a and 7b immediately flanking the blade 3 and driven synchronously by a motor 17 and upstream and downstream idling holder rollers 8a and 8b that push the workpiece 1 transversely into solid contact with the drive rollers 7a and 7b. These holder rollers 8a and 8b are carried on independent hydraulic pusher cylinders 14a and 14b themselves carried on a common transversely displaceable slide 12 itself movable by a single hydraulic ram 13 on a frame 10 on which all the parts of the apparatus are mounted. The frame 10 is about 55 cm wide and the rollers 7a and 7b are 11 cm in diameter.

To both sides of the actual cutting location defined by the blade 3 is a position-detecting roller 9a and 9b. The roller 9a is in fact constituted by the roller 8a and is provided with a rotation sensor 11a, and the roller 9b is a separate large-diameter roller slightly downstream of the roller 8b and provided with its own rotation sensor 11b. A controller 18 is connected to the sensors 11a and 11b and to the actuators 13, 14a, 14b, 16a, and 16b.

In addition the blade 3 is flanked by a pair of abutment blocks or plates 4a and 4b that can be pushed against the respective longitudinal edge of the workpiece 1 by respective actuators 16a and 16b. Directly across the workpiece 1 from the abutment blocks 4a and 4b are pusher blocks 5a and 5b that are operated by respective actuators 15a and 15b carried on the slide 12 and operated, like the actuators 16a and 16b, by the controller 18.

Thus with the system of this invention the controller 18 operates the motor 17 while pressing the rollers 8a through 9b against the far side of the workpiece so that the amount of workpiece displaced past the saw 3 is exactly measured in two locations by the sensors 11a and 11b. Once the desired amount of the workpiece 1 has been displaced past the blade 3, the blocks 4a through 5b are advanced to clamp it tightly in place, and then the blade 3 is advance horizontally in its own plane so as to cut off its downstream end.

I claim:

1. A sawing apparatus comprising:
    a frame;
    a saw blade rotatable on the frame about a horizontal axis and displaceable transversely of the axis;
    conveyor means for displacing an elongated workpiece longitudinally in a transport direction generally parallel to the saw-blade axis past the saw blade and including
        upstream and downstream drive rollers flanking the blade mounted on the frame on one side of the workpiece and
        respective upstream and downstream holding rollers mounted on the frame transversely juxtaposed with the drive rollers and engaging a longitudinal side opposite the one longitudinal side of the workpiece;
    upstream and downstream abutment blocks on the frame engageable with the one side of the workpiece and immediately flanking the blade;
    upstream and downstream pusher blocks on the frame engageable with the opposite longitudinal side of the workpiece transversely opposite the respective abutment blocks;
    upstream and downstream measuring rollers on the frame transversely engaging the workpiece immediately upstream and downstream from the blade;
    respective sensor means associated with the measuring rollers for detecting how much of the workpiece has passed the respective measuring rollers in contact therewith; and
    respective upstream and downstream biasing means on the frame for urging the measuring rollers independently of each other transversely against the workpiece, the frame including a common slide on which is mounted at least one of the holder rollers and one of the measuring rollers and the respective biasing means, the frame being provided with means for urging the entire slide with the one measuring roller and its biasing means transversely toward the workpiece.

2. The sawing apparatus defined in claim 1 wherein one of the holding rollers is provided with the respective sensor means and also acts as the respective measuring roller.

3. The sawing apparatus defined in claim 1 wherein the frame has a transverse dimension of 50 cm to 60 cm, the drive rollers have a diameter of 10 cm to 12.5 cm, and the holding rollers have diameters at most equal to the diameters of the respective drive rollers, the drive rollers longitudinally symmetrically flanking the blade and being longitudinally spaced by a distance equal generally to their diameter.

4. The sawing apparatus defined in claim 1 wherein the saw-blade axis is substantially parallel to the transport direction, whereby the saw blade cuts through the workpiece at 90°.

5. The sawing apparatus defined in claim 1 wherein the blocks are steel plates that longitudinally equidistantly flank the blade and that lie in planes parallel to that of the blade.

6. The sawing apparatus defined in claim 5, further comprising
    respective independently operable actuating means for transversely advancing and retracting the blocks.

7. A sawing apparatus comprising:
    a frame;
    a saw blade rotatable on the frame about a horizontal axis and displaceable transversely of the axis;
    conveyor means for displacing an elongated workpiece longitudinally in a transport direction generally parallel to the saw-blade axis past the saw blade and including
        upstream and downstream drive rollers flanking the blade mounted on the frame on one side of the workpiece and
        respective upstream and downstream holding rollers mounted on the frame transversely juxtaposed with the drive rollers and engaging a longitudinal side opposite the one longitudinal side of the workpiece;
    upstream and downstream abutment blocks on the frame engageable with the one side of the workpiece and immediately flanking the blade;
    upstream and downstream pusher blocks on the frame engageable with the opposite longitudinal side of the workpiece transversely opposite the respective abutment blocks;
    upstream and downstream measuring rollers on the frame transversely engaging the workpiece immediately upstream and downstream from the blade;
    respective sensor means associated with the measuring rollers for detecting how much of the workpiece has passed the respective measuring rollers in contact therewith; and
    respective upstream and downstream biasing means on the frame for urging the measuring rollers independently of each other transversely against the workpiece, the frame including a common slide on which are mounted one of the measuring rollers, the respective biasing means, the pusher blocks, and the respective actuating means, the frame being provided with means for urging the entire slide with the one measuring roller and the respective biasing means transversely toward the workpiece.

* * * * *